United States Patent
Kamthe

(10) Patent No.: US 9,591,562 B2
(45) Date of Patent: Mar. 7, 2017

(54) PROVISIONING ACCESS POINT BANDWIDTH BASED ON PREDETERMINED EVENTS

(71) Applicant: ARUBA NETWORKS, INC., Sunnyvale, CA (US)

(72) Inventor: Ankur Kamthe, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 377 days.

(21) Appl. No.: 14/068,988

(22) Filed: Oct. 31, 2013

(65) Prior Publication Data

US 2015/0120930 A1   Apr. 30, 2015

(51) Int. Cl.
*H04W 48/20* (2009.01)
*H04L 12/911* (2013.01)

(52) U.S. Cl.
CPC .................................. *H04W 48/20* (2013.01)

(58) Field of Classification Search
CPC ..... H04W 84/12; H04W 48/04; H04W 12/06; H04W 12/08; H04W 4/021; H04W 88/08; H04W 8/205; H04L 63/102; H04L 67/2819; H04L 12/4633; H04L 29/12066; H04L 29/12216; H04L 29/12254; H04L 29/12915; G06N 7/005; H04H 60/45; H04H 60/46; H04H 60/39; G01C 21/3617; G06F 21/316; A61B 5/1118; H04N 21/2402

See application file for complete search history.

(56) References Cited

U.S. PATENT DOCUMENTS

| | | | | |
|---|---|---|---|---|
| 7,551,930 B2* | 6/2009 | Lempio | ............. | H04M 1/72572 455/41.2 |
| 8,887,231 B2* | 11/2014 | Wohlert | ............... | H04L 63/101 726/2 |
| 9,411,037 B2* | 8/2016 | Jamtgaard | ................. | G01S 5/00 |
| 9,432,901 B1* | 8/2016 | Kwan | ................. | H04W 36/245 |
| 2001/0029544 A1* | 10/2001 | Cousins | ................. | H04L 29/06 709/233 |
| 2003/0210658 A1* | 11/2003 | Hernandez | ........ | H04W 52/0232 370/311 |
| 2006/0031436 A1* | 2/2006 | Sakata | .................... | H04L 12/14 709/221 |
| 2007/0124244 A1* | 5/2007 | Mock | ..................... | G08G 1/207 705/50 |
| 2007/0223434 A1* | 9/2007 | Bennett | ................. | H04W 52/04 370/338 |

(Continued)

*Primary Examiner* — Sargon Nano
(74) *Attorney, Agent, or Firm* — Brooks, Camerson & Huebsch, PLLC

(57) ABSTRACT

The present disclosure discloses a method and network device for provisioning access point bandwidth based on predetermined events. The disclosed system identifies a pattern for one or more devices over a period of time, the pattern indicating that the one or more devices (a) connect to a particular access point at a particular time of day, or (b) are located near the particular access point at the particular time of day. Prior or approximately the particular time, the disclosed system facilitates at least one client device associated with the particular access point to associate with a second and different access point. The disclosed system then provides, by the particular access point to the one or more devices, access to network resources.

6 Claims, 11 Drawing Sheets

(56) References Cited

U.S. PATENT DOCUMENTS

| | | | |
|---|---|---|---|
| 2008/0042912 A1* | 2/2008 | Lee | H04L 12/4641 343/713 |
| 2008/0268778 A1* | 10/2008 | De La Garrigue | H01Q 1/007 455/41.2 |
| 2009/0201149 A1* | 8/2009 | Kaji | G01C 21/20 340/539.13 |
| 2010/0097995 A1* | 4/2010 | Murphy | H04L 63/101 370/328 |
| 2010/0214914 A1* | 8/2010 | Perez de la Rosa | H04L 47/10 370/230 |
| 2013/0030931 A1* | 1/2013 | Moshfeghi | G01S 19/48 705/16 |
| 2013/0215747 A1* | 8/2013 | Jia | H04L 45/22 370/235 |
| 2013/0223308 A1* | 8/2013 | Chandra | H04W 52/0229 370/311 |
| 2013/0254401 A1* | 9/2013 | Marshall | G06F 21/6218 709/226 |
| 2013/0290862 A1* | 10/2013 | Chand | G06F 17/30867 715/745 |
| 2014/0006161 A1* | 1/2014 | Jabara | G06Q 30/0267 705/14.57 |
| 2014/0036696 A1* | 2/2014 | Lee | H04W 48/18 370/252 |
| 2014/0105037 A1* | 4/2014 | Manthiramoorthy | H04W 4/008 370/252 |
| 2014/0157354 A1* | 6/2014 | Marshall | G06F 21/6218 726/1 |
| 2014/0269280 A1* | 9/2014 | Bhanage | H04W 24/02 370/230 |
| 2014/0280934 A1* | 9/2014 | Reagan | H04L 47/70 709/225 |
| 2014/0280955 A1* | 9/2014 | Stuntebeck | H04L 63/107 709/226 |
| 2014/0282877 A1* | 9/2014 | Mahaffey | H04L 63/0853 726/3 |
| 2014/0302844 A1* | 10/2014 | Shaw | H04W 48/20 455/432.1 |
| 2014/0313901 A1* | 10/2014 | Yacovitch | H04W 28/12 370/236 |
| 2015/0036598 A1* | 2/2015 | Kilpatrick, II | H04W 64/00 370/329 |
| 2015/0036663 A1* | 2/2015 | Kilpatrick, II | H04W 36/0083 370/332 |
| 2015/0038140 A1* | 2/2015 | Kilpatrick, II | H04W 64/00 455/436 |
| 2015/0038143 A1* | 2/2015 | Kilpatrick, II | H04W 64/00 455/436 |
| 2015/0038156 A1* | 2/2015 | Kilpatrick, II | H04W 64/00 455/452.1 |
| 2015/0110087 A1* | 4/2015 | Salkintzis | H04W 48/20 370/338 |

* cited by examiner

ACCESS POINT IDENTIFIERS
200

| TIME OF DAY 220 | AP1 | AP2 | AP3 | AP4 | AP5 | ... ... |
|---|---|---|---|---|---|---|
| 0:00 | O | O | O | O | O | ... ... |
| ⋮ | ⋮ | ⋮ | ⋮ | ⋮ | ⋮ | |
| 9:00 | N | A | N | N | O | ... ... |
| 10:00 | N | A | N | N | O | ... ... |
| 11:00 | N | O | O | N | A | ... ... |
| 12:00 | N | N | O | N | A | ... ... |
| 13:00 | N | N | O | N | A | ... ... |
| ⋮ | ⋮ | ⋮ | ⋮ | ⋮ | ⋮ | |
| 23:00 | O | O | O | O | O | ... ... |

FIG. 2

PROVISIONING ACCESS POINT BANDWIDTH BASED ON PREDETERMINED EVENTS

RELATED APPLICATIONS

The present disclosure is related to the following patent applications: (1) U.S. Patent entitled "SYSTEM AND METHOD FOR ADVERTISING THE SAME SERVICE SET IDENTIFIER FOR DIFFERENT BASIC SERVICE SETS" by Melkote, et al., U.S. Pat. No. 7,948,953, filed Dec. 19, 2005, (2) U.S. Patent entitled "SYSTEM AND METHOD FOR ADVERTISING THE SAME SERVICE SET IDENTIFIER FOR DIFFERENT BASIC SERVICE SETS" by Melkote, et al., U.S. Pat. No. 8,401,554, filed Mar. 22, 2011, (3) U.S. Patent entitled "SYSTEM AND METHOD FOR ADVERTISING THE SAME SERVICE SET IDENTIFIER FOR DIFFERENT BASIC SERVICE SETS" by Melkote, et al., U.S. Pat. No. 8,483,169, filed Feb. 1, 2013, (4) U.S. Patent Application entitled "SYSTEM AND METHOD FOR ADVERTISING THE SAME SERVICE SET IDENTIFIER FOR DIFFERENT BASIC SERVICE SETS" by Melkote, et al., U.S. application Ser. No. 13/910,976, filed Jun. 5, 2013, (5) U.S. Patent Application entitled "INFRASTRUCTURE-ASSISTED CLIENT MANAGEMENT USING SYNTHESIZED BEACON REPORTS" by Ganu, et al., U.S. application Ser. No. 13/195,720, filed Aug. 1, 2011, (6) U.S. Patent Application entitled "SYSTEM AND METHOD FOR RELIABLE MULTICAST OVER SHARED WIRELESS MEDIA FOR SPECTRUM EFFICIENCY AND BATTERY POWER CONSERVATION" by Ganu, et al., U.S. application Ser. No. 14/065,326, filed Oct. 28th, 2013, and (7) U.S. Patent Application entitled "SYSTEM, APPARATUS AND METHOD FOR MANAGING NETWORK DEVICE CONNECTIVITY ON HETEROGENOUS NETWORKS" by Ganu, et al., U.S. application Ser. No. 14/065,343, filed Oct. 28, 2013. The entire contents of the above mentioned patents and/or patent applications are hereby incorporated by reference.

FIELD

The present disclosure relates to network performance. In particular, the present disclosure relates to a method and system for provisioning access point bandwidth based on predetermined events.

BACKGROUND

Adaptive Radio Management (ARM) technology optimizes wireless local area network behavior and automatically ensures that access points (APs) stay clear of RF interference, resulting in a more reliable, higher-performing wireless network. Without disconnecting clients or disrupting applications, ARM can automatically adjust channel assignments on access points. Working with ARM, Aruba Networks, Inc.'s ClientMatch™ technology automatically steers devices to the best AP in the network. This boosts WLAN performance and ensures consistent client performance, eliminating sticky client problems.

Conventionally, ARM reacts to client interactions, for example, when a client tries to connect to a wireless network, ARM matches the best available AP to the client. Note that, ARM repeats this same process each day when the same client tries to connect with the same AP or same set of APs. However, mobile users typically follow certain activity patterns, for example, based on time of day. Thus, it would be inefficient for ARM to re-run the same process to figure out the same best AP for the same client at around the same time everyday when the client tries to connect to the wireless network. This is especially true in a campus network or an office network, where students or employees observe a relatively fixed set of schedules.

BRIEF DESCRIPTION OF THE DRAWINGS

The present disclosure may be best understood by referring to the following description and accompanying drawings that are used to illustrate embodiments of the present disclosure.

FIG. 2 illustrates an exemplary data structure for tracking characteristics of data for a particular client over a period of time according to embodiments of the present disclosure.

DETAILED DESCRIPTION

In the following description, several specific details are presented to provide a thorough understanding. While the context of the disclosure is directed to network flooding, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

The present disclosure relates to network performance. In particular, the present disclosure relates to a method and system for provisioning access point bandwidth based on predetermined events. Specifically, the disclosed system identifies a pattern for one or more devices over a period of time, the pattern indicating that the one or more devices (a) connect to a particular access point at a particular time of day, or (b) are located near the particular access point at the particular time of day. Prior or approximately the particular time, the disclosed system facilitates at least one client device associated with the particular access point to associate with a second and different access point. The disclosed system then provides, by the particular access point to the one or more devices, access to network resources.

Computing Environment

Figure 1:
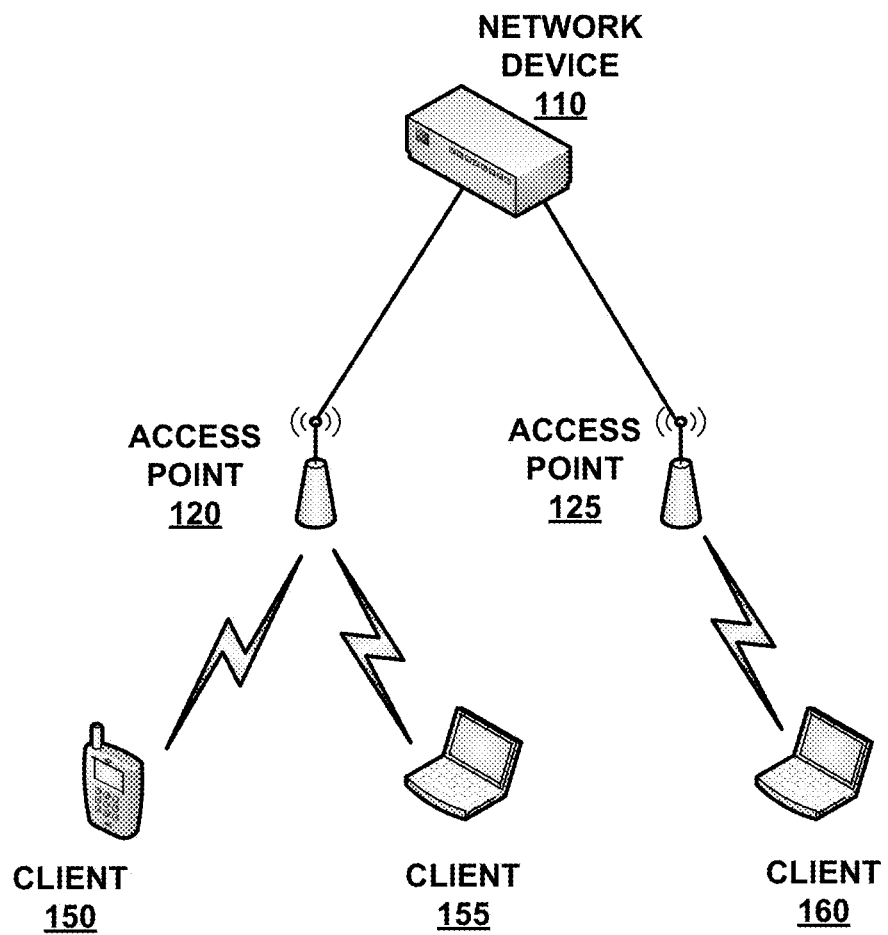
FIG. 1 illustrates an exemplary computing environment according to embodiments of the present disclosure.

FIG. 1 illustrates an exemplary computing environment according to embodiments of the present disclosure. The disclosed system in FIG. 1 includes at least a network device 110, a plurality of access points such as access point 120 and access point 125, and a plurality of client devices such as client 150, client 155, client 160, etc. Network device 110 can be a switch, a network controller, a router, etc. Network device 110 is interconnected with a plurality of access points via wired interfaces. Each of the plurality of access points is connected with a plurality of client devices via wireless links.

Note that, FIG. 1 is a simplified example used for illustration purposes only. In scalable enterprise WLANs, multiple network switches and/or network controlling devices can be deployed with multiple broadcast domains configured on each network switch. Nevertheless, each network switch or network controlling device functions in similar fashion.

Hereinafter, a digital device can be a server, a network device, and/or a client device. A network device generally refers to devices providing for network traffic transmission services, such as a network controller, an access point, a router, etc. A network controller may be a hardware device and/or software module that provide network managements, which include but are not limited to, controlling, planning, allocating, deploying, coordinating, and monitoring the resources of a network, network planning, frequency allocation, predetermined traffic routing to support load balancing, cryptographic key distribution authorization, configuration management, fault management, security management, performance management, bandwidth management, route analytics and accounting management, etc.

An access point may be interconnected with zero or more client devices via either a wired interface or a wireless interface. An access point generally refers to a network device that allows wireless clients to connect to a wired network. Access points usually connect to other network devices via a wired or wireless network.

A router can forward traffic to and receive traffic from the Internet. The router generally is a network device that forwards data packets between different networks, and thus creating an overlay internetwork. A router is typically connected to two or more data lines from different networks. When a data packet comes in one of the data lines, the router reads the address information in the packet to determine its destination. Then, using information in its routing table or routing policy, the router directs the packet to the next/ different network. A data packet is typically forwarded from one router to another router through the Internet until the packet gets to its destination.

A client device may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network.

In some embodiments, when there are multiple access points in a network, network device 110 determines which client device should be steered to connect with which access point based on the capabilities of the client device and the access point. In one embodiment, network device 110 bases its determination on connectivity between a client device and a plurality of APs that the client device connected to in the past, and matches the client device to the AP that provided the best connectivity to the client device in the past.

In some embodiments, when a client device is connected to an AP but does not transmit much network traffic through the AP (for example, when the client device is only used for checking emails occasionally), the client device may not need to be matched to the AP providing best connectivity to the client device. Rather, the client device may be matched to another AP with few capabilities, allowing other client devices that transmit more network traffic (for example, client devices that are used for video conferences on a regular basis) to be connected to the AP with better connectivity.

Characteristics of Data

According to embodiments of the present disclosure, a client profile is created for each client device in the network. The client profile includes a plurality of characteristics of data, such as, time of day, associated access point identifier, a signal strength level corresponding to signals transmitted from the client device, number of transmitted packets, number of received packets, traffic or application type at a particular time for a particular duration, etc.

The characteristics of data can be collected over a period of time at a fixed or variable interval. For example, every 5 minutes, the system may take a snapshot of the characteristics of data and update the repository. An internal and/or external repository, which can be deployed either locally or in a cloud, can be used to store the client profile for all client devices in the network.

FIG. 2 illustrates one example of how the characteristics of data can be collected over time. In this example, the data collected is information about the access point that a particular client device connects to at various time of the day. Specifically, the horizontal axis indicates various access point identifiers 200, e.g., AP1, AP2, AP3, AP4 AP5, etc., that are operating in a network. The vertical axis indicates time of day 220, e.g., 0:00, . . . , 9:00, 10:00, 11:00, 12:00, 13:00, . . . , 23:00, etc. To improve the accuracy of the predetermined events, the interval between the times of day may be further reduced, for example, to every 5 minutes throughout the day.

Furthermore, FIG. 2 tracks, for a particular client device on a particular day, what is the status of each access point in the network. An access point status corresponding to an "A" indicates that the particular client device is associated with the access point at the particular time of day. Likewise, an access point status corresponding to an "N" indicates that the access point is located within the neighborhood of the client device at the particular time of day. Finally, an access point status corresponding to an "O" indicates that the particular client device is neither associated nor located within the neighborhood of the access point.

Specifically, in the example illustrated by FIG. 2, at time 0:00, the particular client device is not connected to any of the access points in the network. At 9:00 to 10:00, the particular client device is connected to AP2. Other neighboring APs of AP2 during this time include AP1, AP3, and AP4. From 11:00 to 13:00, the particular client has roamed in the network and is associated with AP5, whose neighboring APs include AP1 and AP4. Moreover, AP2 may not be in the neighborhood of AP5 at 11 am, for example, due to scheduled maintenance, but AP2 becomes active in the neighborhood of AP5 from 12:00 to 13:00.

Note that, the associated and neighboring AP information can be obtained based on communication exchanges during the particular client device's association phase. Moreover, at a fixed and frequent interval, e.g., every 60 seconds, the AP that the particular client is associated to can send to a network controller device a snapshot of client statistical information, which includes but is not limited to, client connectivity, signal strength, amount of traffic, application-specific traffic, etc. Various characteristics of data can be extracted from the snapshot of client statistical information.

Similar to the associated AP status illustrated in FIG. 2, other characteristics of data may be tracked as well. Thus, the same table as in FIG. 2 can be used to show signal strength level related to signals received to or from a particular client device at various times of day. Alternatively, the table can also be used to show the total number of transmitted and/or received packets to/from the particular client device at various times of day. Moreover, the table shown in FIG. 2 can be modified to track two or more of the aforementioned characteristics of data in combination.

Based on the collected characteristics of data, the system can then compute the probabilities of predetermined events at a particular time of day. For example, the system can compute the probability of a particular client device connecting to a particular AP at 9 am everyday running a video conferencing application for 15 minutes every day, or on Monday every week, etc.

Note that, the data used to generate the client profile can be either current data, or historical data, or both. By taking into account a large amount of historical data in the computation of probabilities of predetermined events, the disclosed system effectively avoids losing information or collecting incomplete information about a client device's activities throughout the day. It is advantageous to store the large amount of historical data on a storage device external to the network controller device to minimize its impact on the network controller device's performance and boost the performance of query on historical client data.

Moreover, building a client profile over an extend period of time allows for predicting probabilities associated with each predicted event. The longer the time period, the more data collected, the more accurate the prediction of the probabilities is when a client traffic pattern is detected.

As such, the system can analyze the client profiles for consistent client traffic patterns over time. Furthermore, based on the observed consistent client traffic patterns, the system can change the behaviors of access points in the network, for example, by allowing fewer clients to be connected to certain access points at certain time of the day.

Identification of Client Traffic Pattern

FIGS. 3A-3E collectively illustrate various exemplary charts depicting identification of client traffic patterns. The data collected may include, are not limited to, the access point that the client is associated with, the amount of traffic transmitted to/from the client, the type of application that the client runs, etc., during any particular time of day.

Figure 3A:
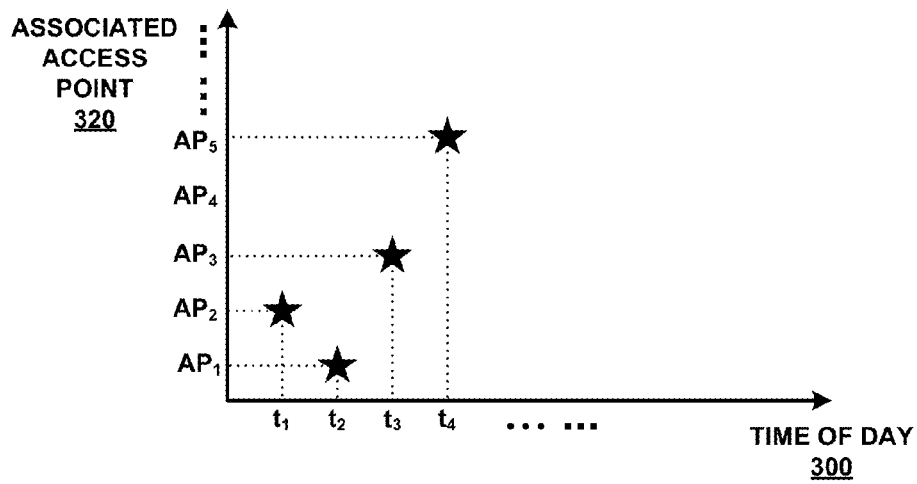
FIG. 3A illustrates exemplary chart depicting the access point that a particular client device is associated with during various times of day according to embodiments of the present disclosure.

Specifically, FIG. 3A illustrates an exemplary chart depicting the access point that a particular client device is associated with during various times of day according to embodiments of the present disclosure. In FIG. 3A, the horizontal axis represents time of day 300, and the vertical axis represents associated access point 320 (which corresponds to the access point that the particular client is associated with at any given time of the day). Here, for example, at time point $t_1$, the client is associated with $AP_2$; at time point $t_1$, the client is associated with $AP_2$; at time point $t_2$, the client is associated with $AP_1$; at time point $t_3$, the client is associated with $AP_3$; at time point $t_4$, the client is associated with $AP_5$; etc.

Figure 3B:
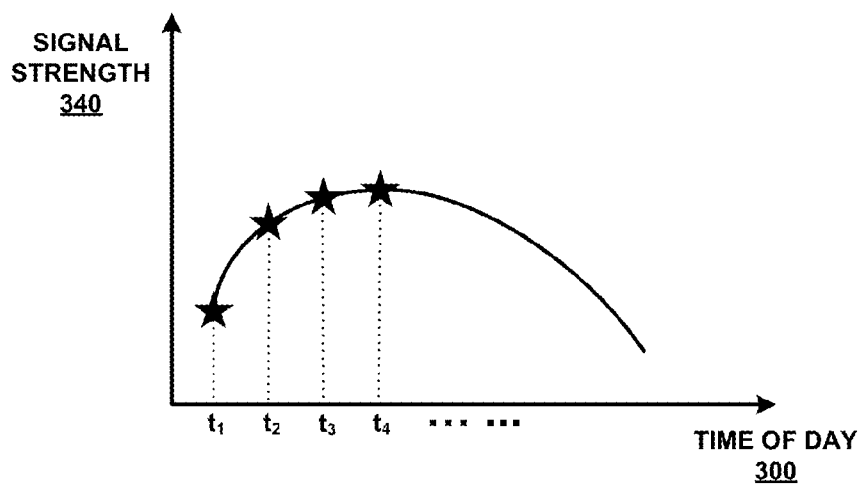
FIG. 3B illustrates exemplary chart depicting the signal strength corresponding to signals received from a particular client device during various times of day according to embodiments of the present disclosure.

FIG. 3B illustrates an exemplary chart depicting the signal strength corresponding to signals received from a particular client device during various times of day according to embodiments of the present disclosure. In FIG. 3B, the horizontal axis represents time of day 300, and the vertical axis represents signal strength 340 (which corresponds to the signal strength of signals received by the access point from the particular client at any given time of the day). Here, for example, FIG. 3B illustrates the following pattern with regard to the signal strength level of signals received from the particular client—at time point $t_1$, the signal strength level is rather low. However, the signal strength level of signals from the particular client increases as the time of day lapses through time points $t_2$ and $t_3$, and peaks at time point $t_4$, then gradually decreases for the rest of the day; etc.

Figure 3C:
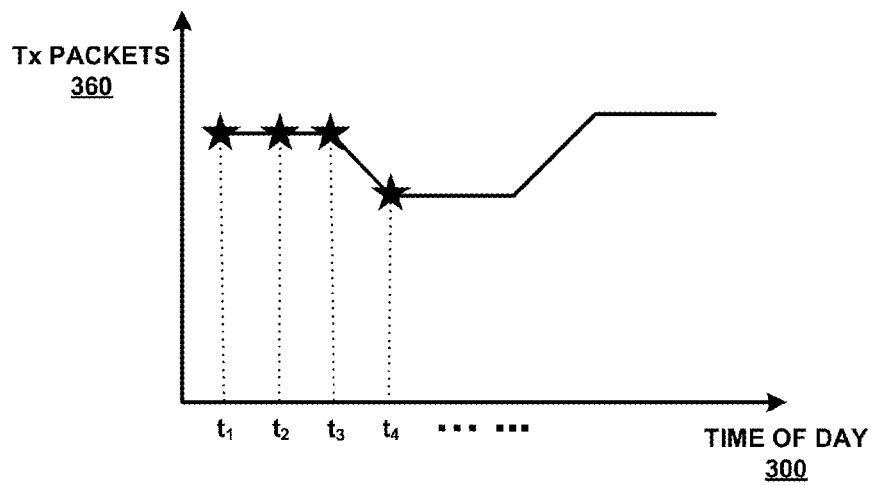
FIG. 3C illustrates exemplary chart depicting the total number of transmitted packets from a particular client device during various times of day according to embodiments of the present disclosure.

FIG. 3C illustrates exemplary chart depicting the total number of transmitted packets from a particular client device during various times of day according to embodiments of the present disclosure. In FIG. 3C, the horizontal axis represents time of day 300, and the vertical axis represents number of transmitted packets 360 (which corresponds to the total number of transmitted packets received by the access point from the particular client at any given time of the day). Here, for example, FIG. 3C illustrates the following pattern with regard to the number of transmitted packets received from the particular client—at time point $t_1$, $t_2$, and $t_3$, the total number of transmitted packets are constantly at a high level. However, from time point $t_3$ to time point $t_4$, the total number of transmitted packets starts to drop to a lower level and remains low for a period of time before the number of transmitted packets increases again later in the day to a high level; etc.

Figures 3D, 3E:
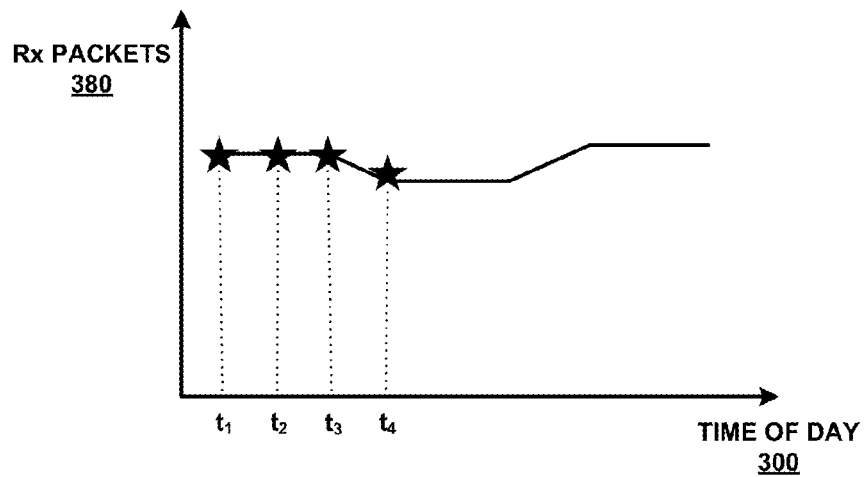
FIG. 3D illustrates exemplary chart depicting the total number of received packets by a particular client device during various times of day according to embodiments of the present disclosure.
FIG. 3E illustrates exemplary data structure for tracking multiple characteristics of data associated with a particular client device during various times of day according to embodiments of the present disclosure.

FIG. 3D illustrates exemplary chart depicting the total number of received packets by a particular client device during various times of day according to embodiments of the present disclosure. In FIG. 3D, the horizontal axis represents time of day 300, and the vertical axis represents number of received packets 380 (which corresponds to the total number of received packets transmitted by the access point to the particular client at any given time of the day). Here, for example, FIG. 3D illustrates the following pattern with regard to the number of received packets for the particular client—at time point $t_1$, $t_2$, and $t_3$, the total number of received packets are constantly at a high level. However, from time point $t_3$ to time point $t_4$, the total number of received packets starts to drop to a lower level and remains low for a period of time before the number of received packets increases again later in the day to a high level; etc.

FIG. 3E illustrates exemplary data structure for tracking multiple characteristics of data associated with a particular client device during various times of day according to embodiments of the present disclosure. In FIG. 3E, matrix 390 is specifically created for the particular client device to track various characteristics of data. Matrix 390 includes a plurality of vectors. For example, matrix 390 includes a time vector $(T_1, T_2, T_3, \ldots, T_n)$ indicating various times of the day that the data in the matrix were collected; an associated AP vector $(AP_1, AP_2, AP_3, \ldots, AP_n)$ indicating the corresponding access point that the particular client is associated with at various times of the day; a signal strength vector $(SS_1, SS_2, SS_3, \ldots, SS_n)$ indicating signal strength level corresponding to signals received from the particular client device at various times of the day; a transmitted packet vector $(Tx_1, Tx_2, Tx_3, \ldots, Tx_n)$ indicating corresponding number of packets transmitted from the particular client device at various times of the day; a received packet vector $(Rx_1, Rx_2, Rx_3, \ldots, Rx_n)$ indicating corresponding number of packets transmitted from the particular client device at various times of the day; an application vector $(APP(Tx_1+Rx_1), APP(Tx_2+Rx_2), APP(Tx_3+Rx_3), \ldots, APP(Tx_n+Rx_n))$ indicating the amount of traffic transmitted by a particular application and/or application category, etc. The above list of vectors is not meant to be exhaustive. Other vectors can also be included in matrix 390 or configured by a network administrator in the similar fashion.

The application and/or application categories may be determined by deep packet inspection and may include, for example, voice/video applications, File Transfer Protocol (FTP) applications, SSI session applications, etc. Because traffic from each application category are typically transmitted via a particular port, the network controller device may determine the type of application or application category by checking the header of the packets for the port identifier or session identifier corresponding to each packet.

Prediction of Client Traffic Event

Figure 4A:
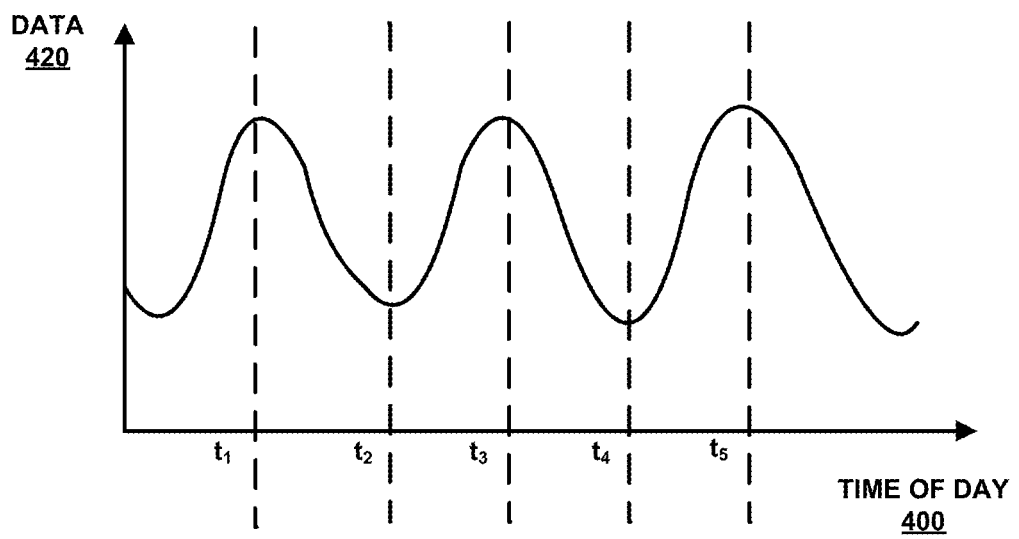
FIG. 4A illustrates an exemplary chart depicting a characteristic of data associated with a particular client device during various times of day on a single calendar day according to embodiments of the present disclosure.
Figure 4B:
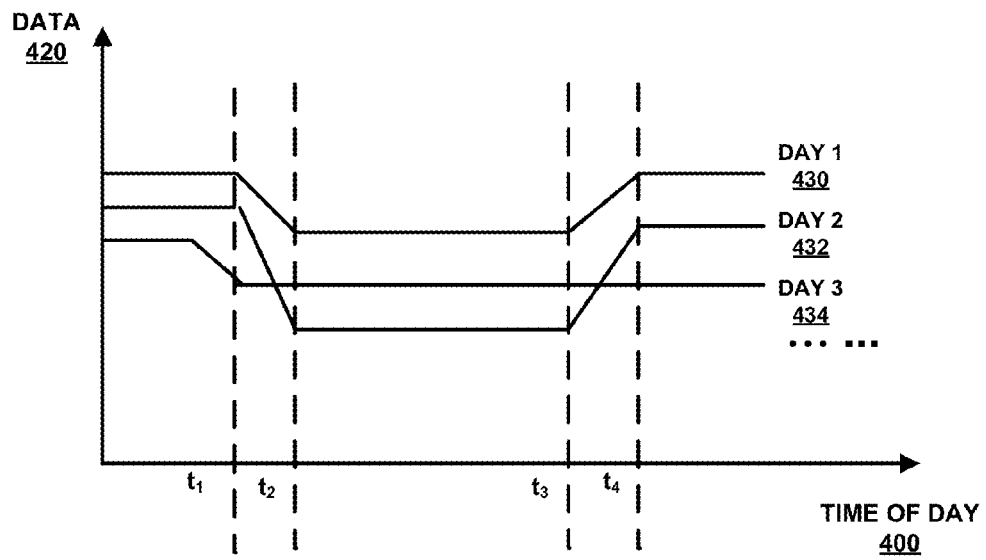
FIG. 4B illustrates an exemplary chart depicting a characteristic of data associated with a particular client device during various times of day on multiple prior calendar days according to embodiments of the present disclosure.
Figure 4C:
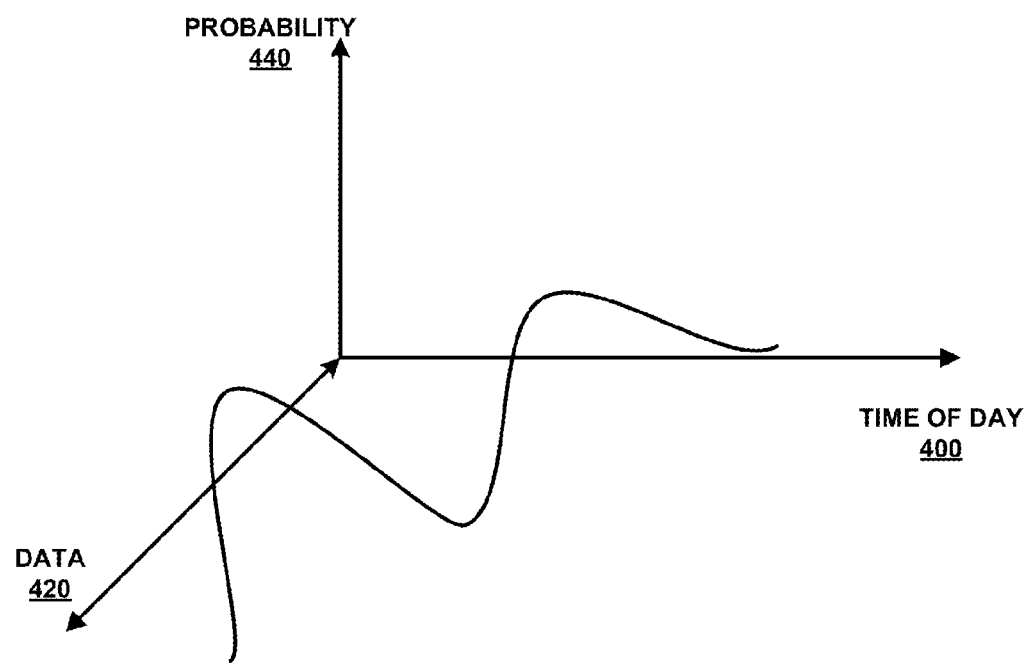
FIG. 4C illustrates an exemplary chart depicting probability of observing a characteristic of data associated with a particular client device during various times of day according to embodiments of the present disclosure.

FIGS. 4A-4C collectively illustrate prediction of client traffic patterns and/or events according to embodiments of present disclosure. Specifically, FIG. 4A illustrates an exemplary chart depicting a characteristic of data associated with a particular client device during various times of day on a single calendar day. In FIG. 4A, the horizontal axis represents time of day 400, and the vertical axis represents a specific characteristic of data 420, which may be any one or a combination of characteristics of data described in the above section. Here, FIG. 4A illustrates the following pattern with regard to the particular characteristics of data—data reaches its peak at time point $t_1$, then starts to drop and reaches its bottom at time point $t_2$. Next, the data starts to rise again and reaches its peak at time point $t_3$, and then the data dropped again to its bottom time point $t_4$, and subsequently increases again to reach it peak at time point $t_5$, etc.

FIG. 4B illustrates an exemplary chart depicting a characteristic of data associated with a particular client device during various times of day on multiple prior calendar days according to embodiments of the present disclosure. In FIG. 4B, the horizontal axis represents time of day 400, and the vertical axis represents a specific characteristic of data 420, which may be any one or a combination of characteristics of data described in the above section. Here, curve 430 illustrates the pattern of data over various time of day on day 1; curve 432 illustrates the pattern of data over various time of day on day 2; curve 430 illustrates the pattern of data over various time of day on day 3; etc. By charting the curves indicating pattern of data over various time of day on a large number of days, the system can analyze and predict a pattern of data, for example, by computing an average or a weighted average value of the data over various time of day based on inputs from multiple days.

FIG. 4B illustrates the following pattern with regard to the particular characteristics of data—On both day 1 and day 2, data starts at a flat and high level until time point $t_1$, then data starts to drop and reaches its bottom at time point $t_2$. Next, the data remains flat and low until time point $t_3$, and then the data increases to a high level at time point $t_4$, and subsequently remains flat after time point $t_4$. On day 3, data starts at a flat and high level but drops before time point $t_1$, then data remains flat through the rest of the day.

FIG. 4C illustrates an exemplary chart depicting probability of observing a characteristic of data associated with a particular client device during various times of day according to embodiments of the present disclosure. When data illustrated in FIG. 4B above are charted for a large number of days, not only the data will allow for detection of a particular traffic pattern occurring at a particular time of day between a particular client device and a particular AP, but the data will also allow for calculation of a probability indicating how likely the particular traffic pattern will happen at the particular time of day between the particular client device and the particular AP in the future.

In FIG. 4C, the horizontal plane represents time of day 400 and a specific characteristic of data 420, which may be any one or a combination of characteristics of data described in the above section. Moreover, the vertical axis represents a probability indicating how likely each traffic pattern will occur at the particular time of day between the particular client device and the particular AP in the future.

With probability distribution information of the traffic pattern illustrated in FIG. 4C, the system can then generate queries based on time of day, traffic statistics/patterns/events, and probability associated with the queried traffic statistics/pattern occurring at the queried time of day. Based on the query results, the system can generate forecasts of specific traffic statistics, patterns, and/or events when the associated probability is greater than a threshold value. The followings are a few examples of characteristics of traffic data and its associated probabilities that the system may query for—

$$P(\text{Assoc-AP}_{t=h+\Delta h}=i|t=h, \text{client}=x);$$

$$P((Tx+Rx)_{t=h+\Delta h}>10\text{MB}|t=h, \text{client}=x);$$

... ...

When P-value>threshold, then the system will affect some change on the AP or WLAN infrastructure for a specified amount of time as described in the following section.

Provisioning Access Point Bandwidth Based on Predicted Pattern

Figure 5:
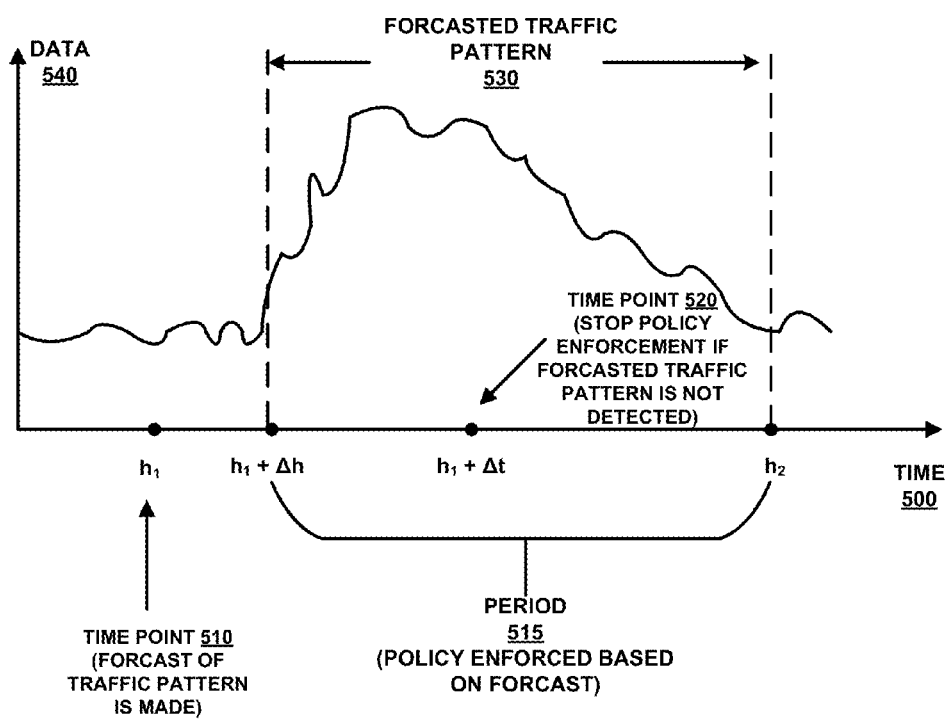
FIG. 5 illustrates an exemplary policy enforcement scheme based on forecasted events at various times of day according to embodiments of the present disclosure.

FIG. 5 illustrates an exemplary policy enforcement scheme based on forecasted events at various times of day according to embodiments of the present disclosure.

In FIG. 5, the horizontal axis represents time of day 500, and the vertical axis represents characteristics of data 540, which may be any one or a combination of characteristics of data described in the above section. Here, forecasted traffic pattern 530 occurs between time point $h_1+\Delta h$ and time point $h_2$. As illustrated in FIG. 5, it is predicted with a probability above a predetermined threshold that traffic transmitted to and from a particular client device time point $h_1+\Delta h$ and time point $h_2$ will increase. The prediction of the increased traffic pattern at time point $h_1+\Delta h$ is made at time point $h_1$, and thus allowing the associated AP's bandwidth to be provisioned in advance during $\Delta h$ prior to forecasted traffic pattern 530 occurs.

Based on forecasted traffic pattern 530 predicted at time point 510, during period 515 between time point $h_1+\Delta h$ and $h_1+\Delta t$, the system enforces a number of network policies. The network policies may include, for example, refraining from responding to other clients' association request; steering existing clients to connect to other neighboring APs; restricting the amount of traffic that can be transmitted by other clients connected to the AP; etc. The goals of enforcing the network policies include, but are not limited to, providing sufficient bandwidth for forecasted traffic pattern 530; providing priority to the particular client device that uses network resources heavily and efficiently; improving the performance of the associated AP; etc.

It is also important to note that, at time point 520 (i.e., time point $h_1+\Delta t$), if forecasted traffic pattern 530 has not been actually detected, the system will stop enforcing the network policies. Thus, the system will allow other client devices to utilize the bandwidth that has been provisioned for the particular client in anticipation of forecasted traffic pattern 530 in the event that forecasted traffic pattern 530 did not actually occur at approximately the predicted time $h_1+\Delta h$.

In one embodiment, the disclosed system may predict that a particular client device will connect to a particular AP at 9 am and starts transmitting heavy traffic loads immediately based on historical characteristics of data collected from the particular client device and the network in the past. The system can then provision the particular access point to reserve a certain amount of bandwidth for the anticipated traffic increase prior to the particular client devices connects to the particular AP at 9 am. This may be done by, for example, steering some existing client devices that are connected to the particular AP to its neighboring APs prior to 9 am, e.g., at 8:55 am, so that the particular AP has available bandwidth for the particular client with anticipated traffic increase to be connected at 9 am.

It is important to note that the system in accordance with the present disclosure is able to provision the AP's bandwidth in advance prior to a forecasted time when the anticipated traffic pattern occurs. If, on the other hand, a specified duration has lapsed after the forecasted time, but the anticipated traffic pattern does not actually occur or detected, the system will stop enforcing the AP bandwidth provisioning policies, which have been created in anticipation of the traffic pattern.

In another embodiment, the system selects among a plurality of APs the best AP for the particular client to connect based on two or more of client characteristics including the number of transmitted packets at a particular time, the number of received packets at a particular time, the type of traffic (e.g., voice, video, data, etc.), the type of application (e.g., video conferencing application, Internet browser, email client application, etc.), etc.

In some embodiments, the system may use the forecasted traffic pattern to prioritize traffic and/or improve AP's performance in lieu of provisioning the access points. For example, an AP may have the capability of supporting IEEE 802.11ac standards. That is, the AP is able to operate on 20 MHz band, 40 MHz band, 80 MHz band, or 160 MHz band. However, the AP is only configured for operating on 20 MHz and 40 MHz bands because of high client density in the surrounding area. When client density is high, in order to reduce the noise level, the AP is usually provisioned to operate at 20 MHz band to provide more stable performance. If a portion of the clients connected to the AP are steered away to the neighboring APs in anticipation of a key client connecting to the AP in the near future with a forecasted traffic pattern, the reduced client density may make it possible for the AP to be configured for operating on 80 MHz or 160 MHz bands. By doing so, the system improves the performance of the AP, and also gives high priority to the traffic associated with the key client.

Processes for Provisioning Access Point Bandwidth Based on Predetermined Events

Figure 6A:
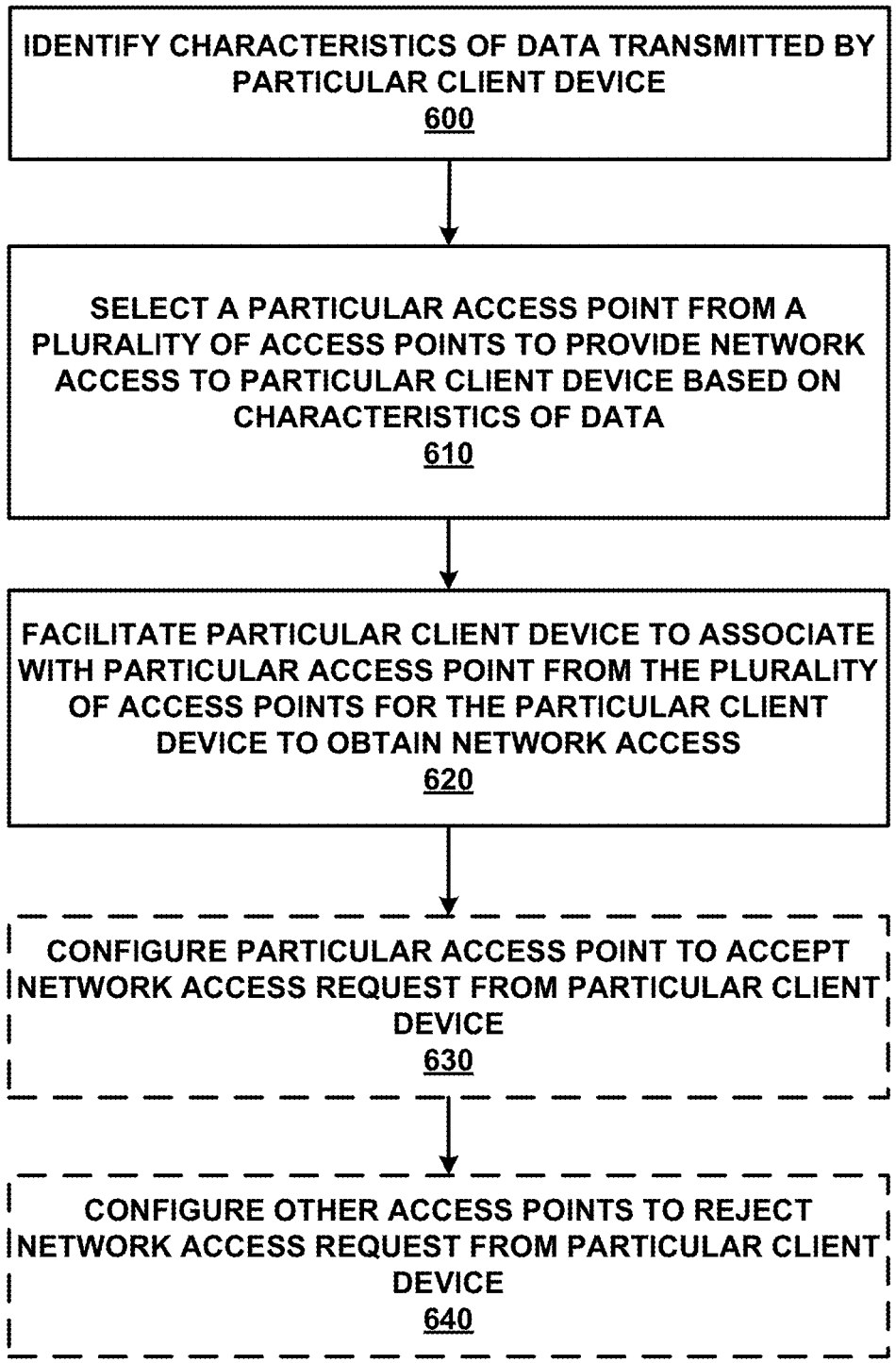
FIGS. 6A-6B are block diagrams illustrating exemplary processes for provisioning access point bandwidth based on predetermined events according to embodiments of the present disclosure.
Figure 6B:
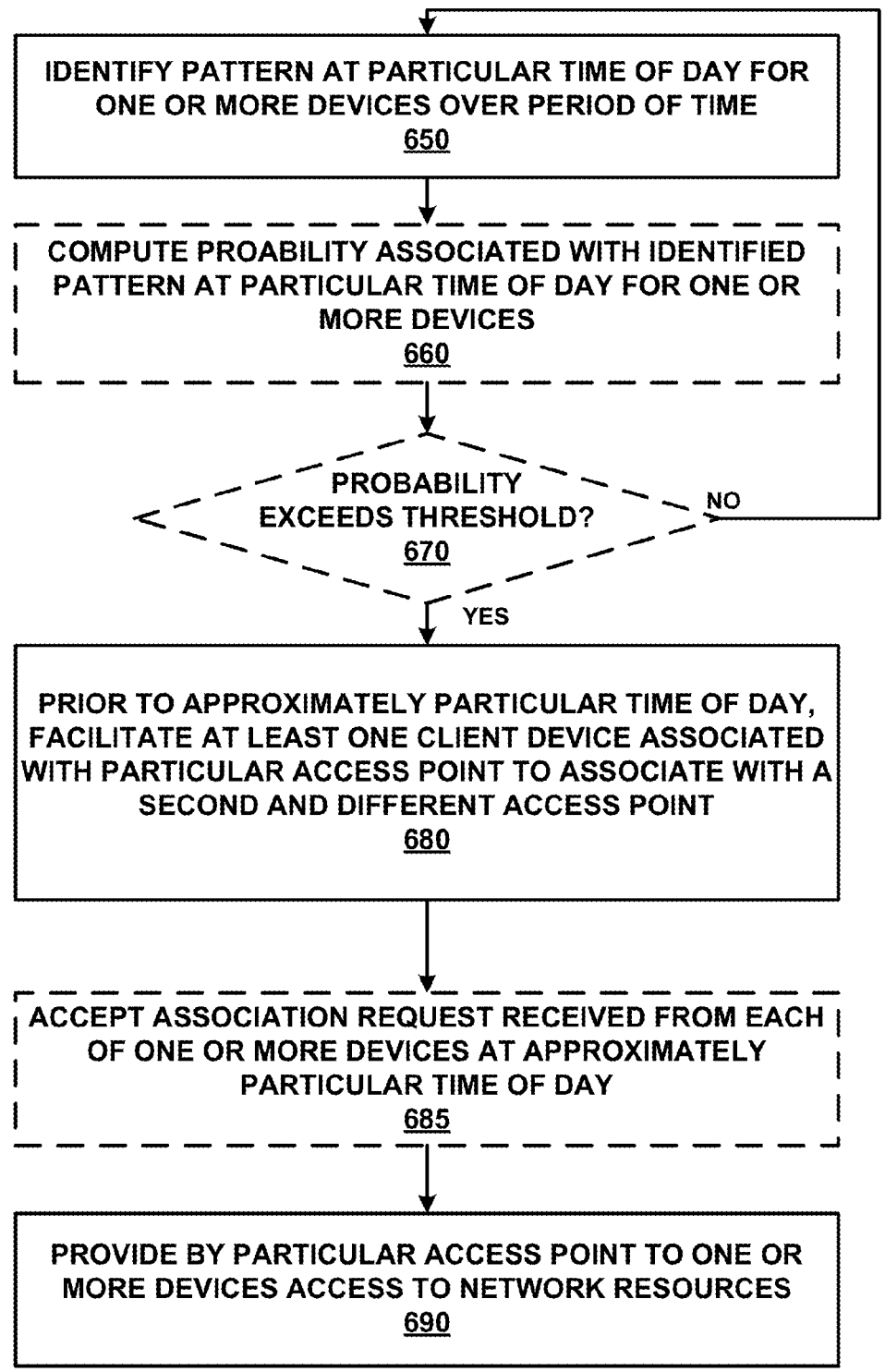

FIGS. 6A-6B are flowcharts illustrating exemplary processes for provisioning access point bandwidth based on predetermined events. As illustrated in FIG. 6A, during operations, the disclosed system identifies characteristics of data transmitted by a particular client device (operation 600). The disclosed system then selects a particular access point from a plurality of access points to provide network access to the particular client device based on the characteristics of the data transmitted by the particular client device (operation 610). Furthermore, the disclosed system facilitates the particular client device to associate with the particular access point from the plurality of access points for the particular client device to obtain the network access (operation 620).

Specifically, in some embodiments, the disclosed system may optionally configure the particular access point to accept a request from the particular client device, the request being related to obtaining network access (operation 630).

In other embodiments, the disclosed system may optionally configure one or more access points other than the particular access point from the plurality of access points to reject the request from the particular client device (operation 640).

Furthermore, note that, the characteristics of the data transmitted by the particular client device may indicate one or more of an application or an application type corresponding to the data, an amount of the data transmitted by the particular client device, etc. Moreover, the data, transmitted by the particular client device, includes current data being transmitted when the selecting operation is performed, and/or historical data collected over a long period of time.

Also, characteristics of data include characteristics of data that are typically transmitted by the particular client device at a same period of time during a set of one or more prior days.

As illustrated in FIG. 6B, during operations, the disclosed system identifies a pattern for one or more devices over a period of time (operation 650). The pattern may indicate that the one or more devices (a) connect to a particular access point at a particular time of day, or (b) are located near the particular access point at the particular time of day. In some embodiments, the pattern is determined based on historical usage of the one or more client devices. In other embodiments, the pattern is based on a calendared event associated with a user of the one or more client devices.

In response to identifying the pattern, the disclosed system may optionally compute a probability associated with identified pattern at a particular time of day for the one or more devices (operation 660). Specifically, the computed probability may comprise a probability value that the one or more devices (a) connect to the particular access point at the particular time of day, or (b) are located near the particular access point at the particular time of day. Alternatively, the computed probability may comprise a probability that an amount of data transmitted by the one or more devices will exceed a threshold value during a period of time starting at approximately the particular time.

Then, the disclosed system determines whether the computed probability exceeds a predetermined threshold (operation 670). If not, the flow is redirected to operation 650 for identification of the next pattern possibly at a different particular time of day for a different device or a different set of devices.

If the computed probability exceeds the predetermine threshold, then prior to or approximately at the particular time, the disclosed system facilitates at least one client device associated with the particular access point to associate with a second access point that is different from the particular access point (operation 680). In particular, the facilitating operation 680 may be based on user characteristics of a user associated with the one or more client devices, characteristics of data transmitted by the one or more client devices, one or more applications corresponding to data transmitted by the one or more client devices, or a combination of the aforementioned characteristics.

In some embodiments, the disclosed system optionally accepts an association request for network access from each of the one or more devices at approximately particular time of day (operation 685). Moreover, the disclosed system provides, by the particular access point to the one or more devices, access to network resources (operation 690).

In some embodiments, the facilitating operation 680 is performed when the at least one client device has a better level of connectivity with the particular access point than the second access point. In other embodiments, the facilitating operation 680 is performed upon determining that the at least one client device historically transmits less data than the one or more client devices. In yet another embodiment, the facilitating operation 680 is performed upon determining that a load at the particular access point is to be reduced.

In some embodiments, the disclosed system identifies a pattern for a second device over a period of time. Furthermore, the pattern indicates that the second device will connect to the particular access point at a particular time of day. In response to identifying the pattern and prior to prior to or approximately at the particular time, the disclosed system facilitates at least one client device associated with the particular access point to associate with a different access point. Then, the disclosed system determines that the second device did not actually connect to the particular access point at approximately the particular time of day. Accordingly, the disclosed system refrains from facilitating client devices associated with the particular access point to associate with other access points.

System for Provisioning Access Point Bandwidth Based on Predetermined Events

Figure 7:
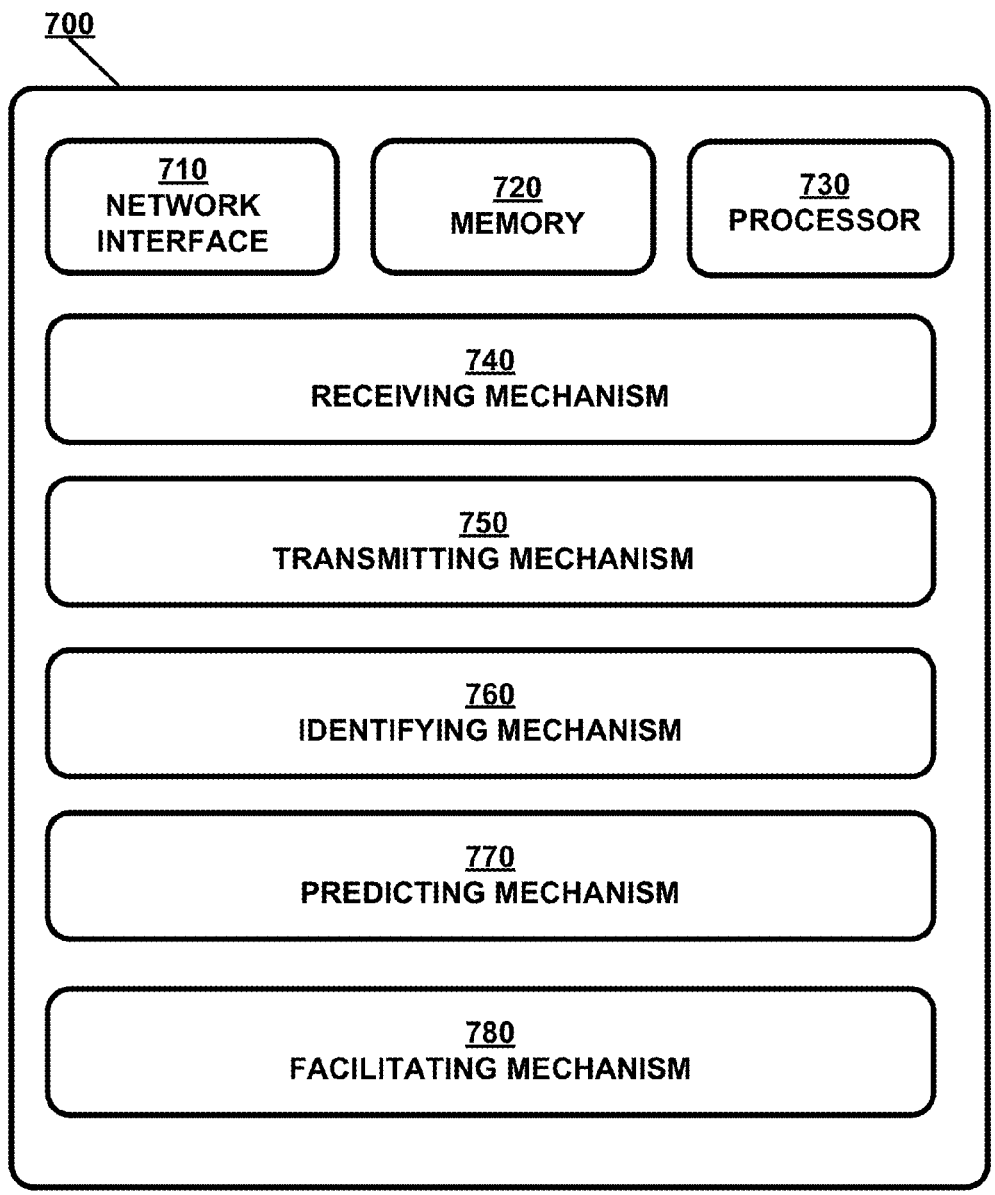
FIG. 7 is a block diagram illustrating an exemplary system for provisioning access point bandwidth based on predetermined events according to embodiments of the present disclosure.

FIG. 7 is a block diagram illustrating a network device or system for provisioning access point bandwidth based on predetermined events. according to embodiments of the present disclosure. Network device 700 includes at least a network interface 710 capable of communicating to a wired network, a memory 720 capable of storing data, a processor 730 capable of processing network data packets, and a number of mechanisms coupled to the processor 730. The mechanisms include, but are not limited to, a receiving mechanism 740, a transmitting mechanism 750, an identifying mechanism 760, a predicting mechanism 770, and a facilitating mechanism 780, etc. Note that, network device 700 may be used as a network switch, network router, network controller, network server, etc. Furthermore, network device 700 may serve as a node in a distributed or a cloud computing environment.

Network interface 710 can be any communication interface, which includes but is not limited to, a modem, token ring interface, Ethernet interface, wireless IEEE 802.11 interface (e.g., IEEE 802.11n, IEEE 802.11ac, etc.), cellular wireless interface, satellite transmission interface, or any other interface for coupling network devices. In some embodiments, network interface 710 may be software-defined and programmable, for example, via an Application Programming Interface (API), and thus allowing for remote control of the network device 700.

Memory 720 can include storage components, such as, Dynamic Random Access Memory (DRAM), Static Random Access Memory (SRAM), etc. In some embodiments, memory 720 includes one or more VLAN membership table or list to store membership information of user VLANs and service VLANs. In some embodiments, the user VLAN membership information is dynamically maintained to reflect the active user VLANs that have packet transmissions within a predetermined period of time.

Processor 730 typically includes a networking processor that is capable of processing network data traffic. In some embodiments, processor 730 may include multiple processing cores and/or ASICs.

Receiving mechanism 740 generally receives packets from other devices in a network via network interface 710. Transmitting mechanism 750 generally transmits packets to other devices in a network via network interface 710.

Identifying mechanism 760 generally identifies a traffic pattern. The pattern may indicate, for example, that the one or more devices (a) connect to a particular access point at a particular time of day, or (b) are located near the particular access point at the particular time of day.

Further, identifying mechanism 760 can also identify characteristics of data transmitted by a particular client device. The characteristics of the data transmitted by the particular client device may indicate one or more of an application or an application type corresponding to the data, an amount of the data transmitted by the particular client device, etc. Moreover, the data, transmitted by the particular client device, includes current data being transmitted when the selecting operation is performed, and/or historical data collected over a long period of time. Also, characteristics of data include characteristics of data that are typically transmitted by the particular client device at a same period of time during a set of one or more prior days.

In some embodiments, the pattern is determined based on historical usage of the one or more client devices. In other embodiments, the pattern is based on a calendared event associated with a user of the one or more client devices.

Predicting mechanism 770 generally forecasts a traffic pattern. Specifically, in some embodiments, predicting mechanism 770 can compute a probability value that the one or more devices (a) connect to the particular access point at the particular time of day, or (b) are located near the particular access point at the particular time of day. Moreover, predicting mechanism 770 determines whether the computed probability exceeds a threshold value. In other embodiments, predicting mechanism 770 computes a probability that an amount of data transmitted by the one or more devices will exceed a threshold value during a period of time starting at approximately the particular time.

Facilitating mechanism 780 generally facilitates access points to provide network access to client devices. In some embodiments, facilitating mechanism 780 selects a particular access point from a plurality of access points to provide network access to the particular client device based on the characteristics of the data transmitted by the particular client device. Facilitating mechanism 780 then facilitates the particular client device to associate with the particular access point from the plurality of access points for the particular client device to obtain the network access.

Optionally, in some embodiments, facilitating mechanism 780 may configure the particular access point to accept a request from the particular client device, the request being related to obtaining network access. In other embodiments, facilitating mechanism 780 may configure one or more access points other than the particular access point from the plurality of access points to reject the request from the particular client device.

Moreover, responsive to a pattern being identified, prior to or approximately at the particular time, facilitating mechanism 780 facilitates at least one client device associated with the particular access point to associate with a second access point that is different from the particular access point. Also, facilitating mechanism 780 provides access to network resources through the particular access point to the one or more devices.

In some embodiments, facilitating mechanism 780 performs facilitating operations when the at least one client device has a better level of connectivity with the particular access point than the second access point. In other embodiments, facilitating mechanism 780 performs facilitating operations upon determining that the at least one client device historically transmits less data than the one or more client devices. In yet another embodiment, facilitating mechanism 780 performs facilitating operations upon determining that a load at the particular access point is to be reduced.

According to embodiments of the present disclosure, network services provided by network device 700, solely or in combination with other wireless network devices, include, but are not limited to, an Institute of Electrical and Electronics Engineers (IEEE) 802.1x authentication to an internal and/or external Remote Authentication Dial-In User Service (RADIUS) server; an MAC authentication to an internal and/or external RADIUS server; a built-in Dynamic Host Configuration Protocol (DHCP) service to assign wireless client devices IP addresses; an internal secured management interface; Layer-3 forwarding; Network Address Translation (NAT) service between the wireless network and a wired network coupled to the network device; an internal and/or external captive portal; an external management system for managing the network devices in the wireless network; etc.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "digital device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer-readable medium storing instructions executable by a processor to cause the processor to:
   identify a pattern of data transmitted by a particular client device;
   create a client profile for the particular client device, wherein the client profile includes:
      the pattern of data; and
      a combination of historical data and current data;
   determine a probability of the particular client device engaging in a predetermined event at a particular time, wherein the probability is determined based on the client profile;
   select a particular access point from a plurality of access points to provide network access to the particular client device based on the client profile and the determined probability; and
   associate the particular client device with the particular access point from the plurality of access points for the particular client device to obtain the network access.

2. The non-transitory computer-readable medium of claim 1, wherein the instructions to allow the particular client device to with the particular access point include instructions to:
   configure the particular access point to accept a request from the particular client device, wherein the request is related to obtaining network access; and
   configure one or more access points other than the particular access point from the plurality of access points to reject the request from the particular client device.

3. The non-transitory computer-readable medium of claim 1, wherein the instructions to identify characteristics of the data transmitted by the particular client device include instructions to identify an application or an application type corresponding to the data.

4. The non-transitory computer-readable medium of claim 1, wherein the instructions to identify characteristics of the data transmitted by the particular client device include instructions to identify an amount of the data transmitted by the particular client device.

5. The non-transitory computer-readable medium of claim 1, wherein the instructions to identify data transmitted by the particular client device include instructions to identify data being transmitted when the selecting operation is performed.

6. The non-transitory computer-readable medium of claim 1, wherein the instructions to identify characteristics of data transmitted by the particular client device include instructions to identify characteristics of data typically transmitted by the particular client device at a same period of time during a set of one or more prior days.

* * * * *